(12) United States Patent
Sakamaki

(10) Patent No.: US 7,149,031 B2
(45) Date of Patent: Dec. 12, 2006

(54) POLARIZING FILTER AND PRODUCING METHOD THEREOF

(75) Inventor: Satoshi Sakamaki, Kanagawa (JP)

(73) Assignee: Fuji Photo Film, Co., Ltd, Kanagawa (JP)

( * ) Notice: Subject to any disclaimer, the term of this patent is extended or adjusted under 35 U.S.C. 154(b) by 44 days.

(21) Appl. No.: 10/642,285

(22) Filed: Aug. 18, 2003

(65) Prior Publication Data

US 2005/0248846 A1 Nov. 10, 2005

(30) Foreign Application Priority Data

Aug. 16, 2002 (JP) .............................. 2002-237578

(51) Int. Cl.
*G02B 1/10* (2006.01)

(52) U.S. Cl. .................. 359/582; 359/580; 359/490

(58) Field of Classification Search ........ 359/490–491, 359/577, 580, 582, 590; 349/96; 353/20; 264/1.31, 1.34
See application file for complete search history.

(56) References Cited

U.S. PATENT DOCUMENTS 4,620,772 A * 11/1986 Sugimoto et al. ............. 349/96
6,731,357 B1 * 5/2004 Tachibana et al. ........... 349/96

FOREIGN PATENT DOCUMENTS

JP       2002071955 A *  3/2002

* cited by examiner

*Primary Examiner*—Drew A. Dunn
*Assistant Examiner*—Joshua L. Pritchett
(74) *Attorney, Agent, or Firm*—Birch, Stewart, Kolasch, Birch, LLP

(57) ABSTRACT

In order to produce a polarizing filter, first and second protective films are adhered to respective surfaces of a polarized film. When M1, M2 are determined as respective coefficients of expansion by water absorption of the first and second protective films, the coefficients of expansion satisfy a formula, $0.65 \cdot M1 < M2 < 1.55 \cdot M1$. A difference of the thickness between the first and second protective films is more than 2 μm and less than 100 μm. Further, the first and second protective films are formed of cellulose triacetate, and the polarized film is formed of polyvinylalcohol series. Thus the polarizing filter has no curl to be formed after the protective films are adhered to the polarized film.

8 Claims, 1 Drawing Sheet

POLARIZING FILTER AND PRODUCING METHOD THEREOF

This nonprovisional application claims priority under 35 U.S.C. § 119(a) on patent application Ser. No(s). 2002-237578 filed in Japan on Aug. 16, 2002, which is(are) herein incorporated by reference.

BACKGROUND OF THE INVENTION

1. Field of the Invention

The present invention relates to a polarizing filter and a producing method thereof, and more particularly to a polarizing filter and a producing method thereof, which is used in an electrical display, such as a liquid crystal panel and the like.

2. Description Related to the Prior Art

An iodine type of a polarized film is most widely used in an electrical display. In order to produce the polarized film of this type, a polymer film whose main content is polyvinylalcohol series are dipped in an iodine-potassium iodide solution, and thereafter, the stretching and the orienting of the polymer film are performed. As the polarized film of the iodine type loses the polarizing characteristics in contact with water or by being heated, a protective film is usually provided on each surface of the polarized film. Substantially, the polarizing filter is constructed of a polarized film and the protective films provided on both sides thereof.

Formerly, the same protective films were adhered to both surface of the polarized film. Concretely, the protective films were formed of the same polymers to have the same thickness and the same physical properties. Recently, however, characteristics for optical compensation, birefringence, control thereof, and antiglare are required to the protective films. Accordingly, the protective films on the both surface of the polarized film have different thickness and different physical properties each other.

As the protective film, cellulose acylate film, such as cellulose acetate film and the like, is widely used in view of low birefringence, transparency, and easy handling. Cellulose acylate film has an excellent transparency, an adequate moisture permeability, and a large mechanical strength. Further, the polymer film of the polyvinylalcohol type is widely used as the polarized film.

The above cellulose acylate film is produced in a method of producing a film from a dope solution, which polymer is dissolved to or dispersed in a solvent to prepare. The dope solution is cast on a substrate with a die, dried and, if necessary, cooled to form the polymer film. Then the polymer film is peeled from the substrate and fed with a feeding means to dry the polymer film furthermore. Note that as the transporting means there are a feed roller which applies a tension force in a feeding direction, and a tenter drier (or tenter) which tenses the polymer film in a widthwise direction. Further, the feed rollers and the tenter drier may be combined to feed the polymer film.

However, when the different protective films are adhered to the both surfaces of the polarized film, then the polarizing filter forms a curl. Accordingly, the appearance of the polarizing filter becomes bad and the attachment of the polarizing filter to a liquid crystal panel becomes harder.

SUMMARY OF THE INVENTION

An object of the present invention is to provide a polarizing filter and a producing method thereof, whose appearance is good, and whose handling, or attachment to a liquid crystal display, is easily.

Another object of the present invention is to provide a polarizing filter and a producing method thereof, which has no curl to be formed after protective films are adhered to a polarized film.

In order to achieve the object and the other object, the polarizing filter of the present invention includes a polarized film and first and second protective films which are adhered to both respective surfaces of the polarized film. The first and second protective films are different in at least one of thickness, physical properties and materials. When M1 and M2 are determined as respective coefficients of expansion by water absorption of the first and second protective films in a direction of a light absorption axis of the polarizing filter, then the coefficients of expansion M1, M2 satisfy a formula, $0.65 \cdot M1 < M2 < 1.55 \cdot M1$.

A difference of the thickness between the first and second protective films is more than 2 μm and less than 100 μm.

In the present invention, a producing method of the polarizing filter includes steps of selecting first and second protective films. The first and second protective films are different in at least one of thickness, physical properties and materials. When M1 and M2 are determined as the respective coefficients of expansion by water absorption of the first and second protective films, then the coefficients of expansion M1, M2 satisfy a formula, $0.65 \cdot M1 < M2 < 1.55 \cdot M1$. Then the first and second protective films are adhered to the respective surfaces of the polarized film.

According to the invention, the polarizing filter has no curl to be formed after the protective films are adhered to the polarized film. Thus the polarizing filter has a good appearance and can be easily handled, for example, attached to a liquid crystal display.

BRIEF DISCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

Figure 1:
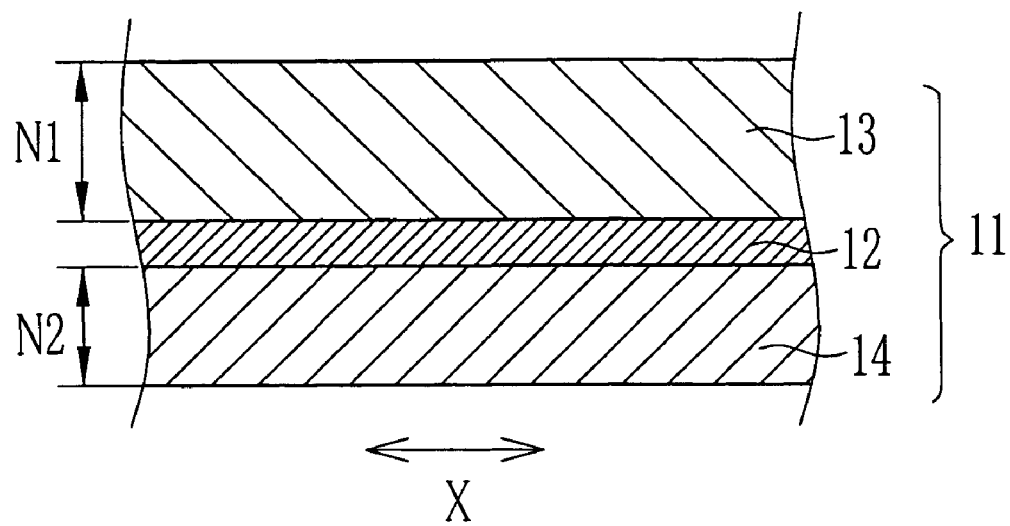
FIG. 1 is a sectional view of a polarizing filter of the present invention.

In FIG. 1, a polarizing filter 11 is constructed of a polarized film 12 and first and second protective films 13, 14 which are adhered to respective surfaces of the polarized film 12. The first and second protective films 13, 14 are different from each other, namely, these are formed of different polymers, or sorts of additives or ratio thereof are different. Further, although sorts and ratio of raw materials are the same to form the first and second protective films 13, 14, they have different thickness, orientation, physical properties, such as elastic modules.

Further, the first and second protective films have respective coefficients of expansion by water absorption. M1 is determined as the coefficient of expansion by water absorption of the first protective film 13 in a direction X of the light absorption axis of the polarizing filter 11. M2 is determined as the coefficient of expansion by water absorption of the second protective film 14 in the direction X of the light absorption axis of the polarizing filter 11. Further, thickness of the first protective films 13 is N1, and thickness of the second protective film 14 is N2, while N1 and N2 are different. In this embodiment, the protective films 13, 14 satisfy the condition of 0.65·M1<M2<1.55·M1. In this case, it is prevented to curl in the polarizing filter 11 in which the first and second protective films 13, 14 are adhered to the polarized film 12.

Preferably, the coefficient of expansion M2 of the second protective film 13 is more than 0.70 times and less than 1.40 times as large as the coefficient of expansion M1 of the first protective film 14, and particularly, the coefficient of expansion M2 of the second protective film 13 is more than 0.85 times and less than 1.20 times as large as the coefficient of expansion M1 of the first protective film 14. Note that the conditions of M1>0.02 or M2>0.02 are substantially satisfied when the measurement accuracy of the coefficients of expansion M1, M2 and materials of the first and second protective films 13, 14 are considered. Note that front and rear surfaces are not determined in this embodiment.

Further, when an absolute value of a difference of the thickness N1, N2 between the first and second protective films 13, 14 is more than 2 μm and less than 100 μm, then it is especially prevented to form the curl.

Figure 2:
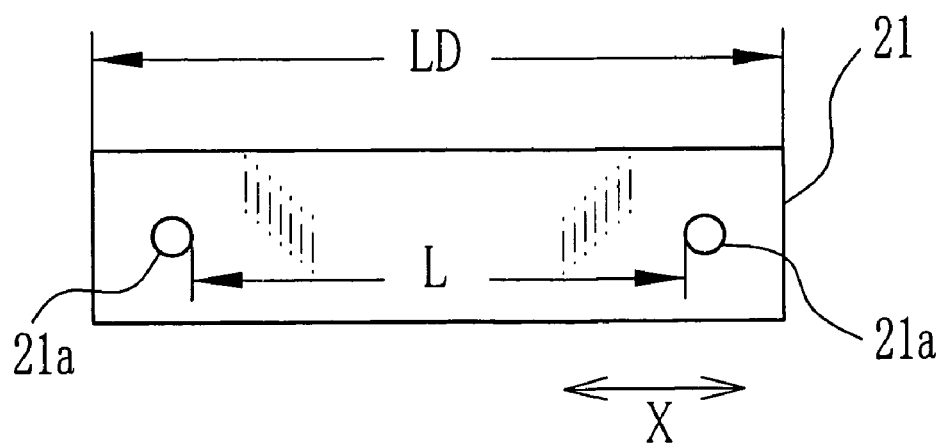
FIG. 2 is a plan view of a fragmental sample obtained from the first protective film in FIG. 1.

When it is designated to measure the coefficient of expansion M1, the first protective film 13 is cut to a fragmental film sample, or strip specimen, 21 illustrated in FIG. 2. The strip specimen 21 has a rectangular shape and a length LD of 120 mm such that a lengthwise direction of the strip specimen 21 may be parallel to the direction X of the light absorption axis of the polarizing filter 11. The strip specimen 21 is set under conditions of 23° C. and relative humidity 65% for two hours. Thereafter, two holes 21a having diameter of 6 mm are formed in the strip specimen 21 such that two holes 21a may be apart from each other about 100 mm in the direction X of the light absorption axis. The distance between the two holes 21a is L. Note that, if the strip specimen 21 has not a rectangular shape but a square shape, the two holes 21a are formed so as to have a distance L in the direction X of the light absorption axis of the polarizing filter 11.

The distance L between the two holes 21a is accurately measured with a pin gauge whose smallest scale is $\frac{1}{1000}$ (mm), and the measured value is determined as a standard distance L1. Then the strip specimen 21 is disposed in a water of 20° C. for 30 minutes. After removing the strip specimen 21 from the water, the distance L is measured soon, and determined as a water absorption distance L2. The coefficient of expansion M1 by water absorption is calculated in the formula of:

$$M1=\{(L2-L1)/L1\} \times 100$$

Note that the coefficient of expansion M2 by water absorption is obtained in the same method.

Further, in the present invention, the polymers of the first and second protective films 13, 14 are preferably cellulose acylate, such as cellulose acetate, cellulose acetate butylate, cellulose acetate propionate and the like, and especially preferably cellulose acetate. Note that the present invention is not restricted in them, and other polymers which are already known may be used as the protective film. As the polymers, for example, there are polyesters (polyethylene telephthalate, polyethylene -2,6-naphthalate, and the like), polycarbonate, polystyrene, polyamide, polyolefines and the like. Especially preferable are polyolefines, such as Zeonex and Zeonor (trade name, produced by Zeon Corporation), ARTON (trade name, produced by JSR Corporation) and the like.

There is a method of producing a polymer film (such as the protective films 13, 14) from a dope solution in which cellulose acylate is contained. In this method, the dope solution is cast on a substrate with a die. As the substrate, there are a belt, a drum, a glass plate or the like. On the substrate, the dope solution is dried to remove the solvent and to form a polymer film having enough rigidity. Then the polymer film is peeled from the substrate, and fed with a feeding means through a drying section in which the polymer film is guided with rollers and dried. In this case, properties of the produced polymer film depend on film forming conditions. Materials, temperature of the substrate, and the drying speed and the like have influences on the coefficients of expansion M1, M2 by water absorption.

In order to prepare the dope solution, the solute is dissolved or dispersed. Usually the solute is dissolved in a ordinary temperature. However, the dope solution may be prepared in a cool-dissolving method and a heat-dissolving method.

In the cool-dissolving method, the polymers and the additives are added to a solvent at about the room temperature in the range of −10° C. to 40° C. simultaneously, or gradually with stirring by a stirrer. Instead thereof, solutions or dispersion solutions containing the respective components may be prepared and thereafter mixed. Then the mixture is cooled. In this case, a cooling bath may be used, for example, a dry ice/methanol bath (−75° C.), a methylenegrycol bath (from −30° C. to −20° C.) or the like. During cooling the mixture, it is solidified, and thereafter heated to a temperature about from 0° C. to 200° C., to obtain the dope solution in which each component moves in the solvent. Note that the solidified mixture may be disposed in a room or in a bath of hot water to make the temperature higher.

In the heat-dissolving method, the polymers and the additives are added to a solvent at about the room temperature in the range −10° C. to 40° C. simultaneously, or gradually with stirring by a stirrer. Then the mixture is heated to have temperature in the range of 70° C. to 240° C. under a pressure from 0.2 MPa to 30 MPa. Preferably the temperature is from 80° C. to 220° C. Thus the components are dissolved or dispersed in the mixture. Thereafter, the mixture is cooled to a boiling point, usually from −10° C. to 50° C. When a liquid mixture of plural liquids is used as the solvent, the temperature is at most the lowest boiling point of the liquids. Thus the dope solution is obtained. Preferably, in order to cool the mixture, a cooling device is used, in which a cooling medium (cooling water and the like) is used.

There are several types of the polymers which can be main components for the polarized film 12 of the present invention, such as polyvinylalcohol series, polycarbonate series, cellulose series, and the like. The most preferable is polyvinylalcohol series. In polyvinylalcohol series, there are not only polyvinylalcohol but also alkyl denatured polyvinylalcohol. Further, the polyvinylalcohol series are produced by saponificating polyvinyl acetate to which vinyl acetate is polymerized. However, the polyvinylalcohol series may be produced in polymerization of vinyl acetate with small amount of the unsaturated carboxylic acid, their derivatives (for example, salts, esters, amides, nitrils and the like), olefins, vinyl ethers, salts of unsaturated sulfonic acids. Alkyl denatured polyvinylalcohol have alkylgroup at an end of molecule thereof, and saponification degree is at least 80%, and polymerization degree is at least 200.

The polarized film of the polymer of polyvinylalcohol series (hereinafter polyvinylalcohol film) may be stained in a gas phase absorption method or a liquid phase absorption method. In this embodiment, the polarized film 12 is stained in the liquid phase absorption method. However, the present invention does not depend on these methods.

In the staining in the liquid phase absorption method of this embodiment, iodine is used. However, the present invention is not restricted in it. The polyvinylalcohol film is dipped in the aqueous solution of iodine/potassium iodinate (KI) for from 30 seconds to 5000 seconds. Preferably, the concentration of iodine in the solution is from 0.1 g/L to 20 g/L, and that of potassium iodinate is from 1 g/L to 100 g/L. Note that it is preferable that temperature of the solution for dipping the polyhvinyl alcohol is from 5° C. to 50° C.

In the liquid phase absorption method, iodine or other dye may be coated or sprayed on the polyvinylalcohol film in a way already known, instead of dipping the polyvinylalcohol film.

Instead of iodine, dichroic dye can be used. In the dichroic dyes, there are dye materials of azo dye, stilbene dye, pyrazolone dye, triphenylmethane dye, quinoline dye, oxadine dye, tiadine dye, antraquinone dye and the like. Preferably, the dye materials can be dissolved to water. Preferably, dichroic dye has hydrophilic group, such as sulfonic acid group, amino group, hydroxyl group and the like.

As the dichroic dye, there are CI direct yellow 12, CI direct orange 39, CI direct orange 72, CI direct red 39, CI direct red 79, CI direct red 81, CI direct red 83, CI direct red 89, CI direct violet 48, CI direct blue 67, CI direct blue 90, CI direct green 59, CI acid red 37, and the like.

Further, there are other dyes described in Japanese Patent Laid-Open Publications No. 1-161202, 1-172906, 1-172907, 1-183602, 1-248105, 1-265205, 7-261024 and the like. these dichroic dyes are used as free acids, alkali metal salt, ammonium salt, and amine salt.

When the plural dichroic dyes are mixed, then the polarized film can have plural color phases or hues. Preferably, the polarizing filter (or the polarizing element) has compounds such that the two polarizing filters (or the polarizing elements) may turn black when they are set in cross nicol position. Further, preferable are compounds in which several sorts of dichroic dye are mixed, such that the polarizing filter or the polarizing element may turn black. Such polarizing filter or such polarizing element is excellent in both single transmittance and polarization coefficient.

In this embodiment, the polyvinylalcohol film is tensed to become the polarized film. Note that the polyvinylalcohol may be colored before or after stretching. However, after being stained, the polyvinylalcohol film is adequately swollen and the film thereof is tensed after staining. Accordingly, it is preferable that the polyvinylalcohol film is stained before stretching.

When it is designated that the polyvinylalcohol film is tensed after coloring, then compounds (or cross-linking agent) for cross-linking polyvinylalcohol is used. Concretely, the polyvinylalcohol film is dipped into a solution of the cross-linking agent, and otherwise the cross-linking agents are coated or sprayed onto the polyvinylalcohol film. Thus, the polyvinylalcohol film is hardened so as to have adequate orientation. Note that the cross-linking agent of polyvinylalcohol series is described in the U.S. Reissued patent application Ser. No. 232897 or may be others already known. Especially preferable are boric acid based materials.

In order to adhere the first and second protective films 13, 14 to the polarized film 12, there are a method of applying an adhesive agent, or a method of surface chemical treatment to supply an adhesive property for at least one pair of surfaces of the polarized film 12 and the first protective film 13 or the second protective film 14, such that they are overlapped sequentially. When cellulose acylate is used as the polymer in the protective films 13, 14, there are especially preferable methods for surface treatment, for example, acid treatment, alkali treatment, corona discharge treatment, glow discharge treatment, exposing to UV radiation.

In this embodiment, the protective films 13, 14 are adhered to the polarized film 12 with the adhesive agent after the surface treatment. The surface treatment is saponification by alkali. Concretely, the first and second protective films 13, 14 formed of cellulose acylate are dipped in alkali solution, and then neutralized in an acid solution, thereafter washed with a water, and dried. As the alkali solution, for example, sodium hydroxide and potassium hydroxide are used, and concentration thereof is preferably from 0.1 N to 3.0 N. Otherwise, the temperature of the alkali solution is preferably from the room temperature to 90° C.

When it is designated that the first and second protective films 13, 14 are adhered to the polarized film 12 through the adhesive agent, the adhesive agent may be already known. Especially preferable are solutions of boron compounds or polyvinylalcohol which contain denatured polyvinylalcohol having acetoacetyl group, sulfonic acid group, carboxyl group, oxyalkylene group and the like. Preferably, the adhesive agent has thickness from 0.01 μm to 10 μm after drying, and particularly from 0.05 μm to 5 μm.

Further, the surfaces of the first and second protective films 13, 14 may be provided with an antireflection layer, an antiglare layer, a lubricant layer and an adhesive layer. Further, an optical compensation film may be adhered to one of the first and second protective films 13, 14 in the polarizing filter 11 to obtain an optical compensation sheet. These products can be parts for a liquid crystal display.

[Examination]

According to the invention, the following examination was made. In the examination, two dope solutions DS1, DS2 were prepared for forming five sorts of the polymer films A, B, C, D, E, and these polymer films were used as the first and second protective films 13, 14. Methods for preparing the dope solutions DS1, DS2, and for forming the polymer films A–E will be described as follows.

| (Dope Solution DS1) | |
|---|---|
| Cellulosetriacetate | 89.3 wt. % |
| (Degree of Substitution of acetyl group was 2.8) | |
| Triphenylphosphate (TPP) | 7.1 wt. % |
| Biphenyldiphenylphosphate | 3.6 wt. % |

To these solid materials were added a mixture of following solvents:

| Dichloromethane | 92 wt. % |
|---|---|
| Methyl alcohol | 8 wt. % |

Thereafter, the mixture of the solids materials and the solvents were stirred to obtain the dope solution DS1 whose solid concentration is 18.5 wt. %.

| (Dope Solution DS2) | |
|---|---|
| Cellulosetriacetate | 89.5 wt. % |
| (Degree of Substitution of acetyl group was 2.8) | |

-continued (Dope Solution DS2)

| | |
|---|---|
| Triphenylphosphate (TPP) | 7.0 wt. % |
| Biphenyldiphenylphosphate | 3.5 wt. % |

To these solid materials were added a mixture of following solvents:

| | |
|---|---|
| Dichloromethane | 82 wt. % |
| Methyl alcohol | 15 wt. % |
| n-butyl alcohol | 3 wt. % |

Thereafter, the mixture of the solid materials and the solvents were stirred to obtain the dope solution DS2 whose solid concentration is 23.5 wt. %.

(Production Of Polymer Film A)

The dope solution DS1 was cast on the substrate and dried to become the polymer film A having self-supporting property. The polymer film A was peeled from the substrate, and dried with the tenter drier and the drying section. Then the polymer film A was rolled. The substrate was a metallic band. The thickness of the polymer film A was 80 μm, and the coefficient of expansion in the lengthwise direction of the polymer film A was 0.49%.

(Production Of Polymer Film B)

The dope solution DS1 was cast on the substrate and dried to become the polymer film B having self-supporting property. The polymer film B was peeled from the substrate, and dried with the tenter drier and the drying section. Then the polymer film B was rolled. The substrate was a metallic band. The thickness of the polymer film B was 60 μm, and the coefficient of expansion in the lengthwise direction of the polymer film B was 0.49%.

(Production Of Polymer Film C)

The dope solution DS2 was cast on the substrate and dried to become the polymer film C having self-supporting property. The polymer film C was peeled from the substrate, and dried with the tenter drier and the drying section. Then the polymer film C was rolled. The substrate was a metallic dram, and the temperature of the metallic dram was −3° C. in casting the dope solution thereon. The thickness of the polymer film C was 80 μm, and the coefficient of expansion in the lengthwise direction of the polymer film C was 0.25%.

(Production Of Polymer Film D)

The dope solution DS2 was cast on the substrate and dried to become the polymer film D having self-supporting property. The polymer film D was peeled from the substrate, and dried with the tenter drier and the drying section. Then the polymer film D was rolled. The substrate was a metallic dram, and the temperature of the metallic dram was −3° C. in casting the dope solution thereon. The thickness of the polymer film D was 108 μm, and the coefficient of expansion in the lengthwise direction of the polymer film D was 0.28%.

(Production Of Polymer Film E)

The dope solution DS2 was cast on the substrate and dried to become a film. The film was peeled from the substrate, and fixed to a frame made of steel. Then the film in the frame was set for 30 minutes in a thermostatic chamber having a constant temperature of 120° C. to obtain the polymer film E. The thickness of the polymer film E was 80μm, and the coefficient of expansion in the lengthwise direction of the polymer film E was 0.35%.

(Production Of Polarized film)

First and second mixture solutions were prepared. The first mixture solution contains 0.3 g/L of iodine and 18.0 g/L of potassium iodinate. The second mixture solvent contains 80 g/L of boric acid and 30 g/L of potassium iodinate. A polyvinyl alcohol film (produced by Kraray Co. Ltd.) having thickness of 75 μm m was dipped in the first mixture solution, and thereafter tensed in the second mixture solution of the boric acid and potassium iodinate at 50° C., so as to have a five times size. Thus the polarized film 12 was obtained.

(Production Of Polarizing Filter)

The polymer films A–E were dipped in a 1.5N NaOH solution for 180 seconds. Then the neutralization was performed, and thereafter washed in water. Just after washing in water, combination of two of the polymer films A–E as illustrated in Table 1 were adhered as the protective films 13, 14 to both surface of the polarized film 12 with an adhesive agent. Thereby the lengthwise of the two of the polymer films A–E and the stretching direction of the polyvinyl alcohol film for the polarizing filter were in the same direction. Note that the adhesive agent was a solution of 4 wt. % of polyvinyl alcohol (Trade name PVA-117H, produced by Kraray Co. Ltd.). Thereafter, the polarized film 12 and the protective films 13, 14 were set for 30 minutes under air in a thermostatic chamber whose inner temperature was kept at 80° C. to obtain the polarizing filter. Note that other three types of the polarizing filters were produced, in which the same polymer films were used as the first and second protective films 13, 14 . Such other polarizing filters were named as References 1–3 illustrated in Table 1.

(Estimation Of Curl Of Polarizing Filter)

The polarizing filter was cut to square filter fragments such that each filter fragment may have a size 10 cm×10 cm and diagonal line thereof was parallel to the direction of the light absorption axis of the polarizing filter. The filter fragment was disposed on a glass plate in room temperature and humidity for 30 minutes. Then corners of the filter fragment rise upwards. The level of an apex of each corner, or a distance from the glass plate to the each apex, was measured. Then the maximal level was determined as a curl value, on the basis of which the estimation of the polarizing filter is made. When the polarizing filter was usable, then estimation was P (Pass). When the polarizing filter was not usable, then the estimation was L (Loss). Note that following abbreviations are used in Table 1:

Ex.: Example
Co.: Comparison
Re.: Reference
PF1: First protective film
PF2: Second protective film
M1: Coefficient of expansion of first protective film
M2: Coefficient of expansion of second protective film
N1: Thickness of first protective film
N2: Thickness of second protective film
CV: Curl value

TABLE 1

|  | PF1 | PF2 | M1 | M2 | 0.65 M1 | 1.55 M1 | \|N1−N2\| | CV | Est. |
|---|---|---|---|---|---|---|---|---|---|
| Ex. 1 | A | B | 0.49 | 0.42 | 0.32 | 0.75 | 20 | 1 | P |
| Ex. 2 | C | D | 0.25 | 0.28 | 0.16 | 0.39 | 28 | 2 | P |
| Ex. 3 | D | E | 0.28 | 0.35 | 0.18 | 0.43 | 28 | 5 | P |
| Ex. 4 | A | E | 0.49 | 0.35 | 0.32 | 0.75 | 0 | 7 | P |
| Co. 1 | A | C | 0.49 | 0.25 | 0.32 | 0.75 | 0 | 20 | L |
| Co. 2 | A | D | 0.49 | 0.28 | 0.32 | 0.75 | 28 | 17 | L |
| Co. 3 | C | B | 0.25 | 0.42 | 0.16 | 0.39 | 20 | 13 | L |
| Re. 1 | A | A | 0.49 | 0.49 | 0.32 | 0.75 | 0 | 1 | P |
| Re. 2 | C | C | 0.25 | 0.25 | 0.16 | 0.39 | 0 | 0 | P |
| Re. 3 | D | D | 0.28 | 0.28 | 0.18 | 0.43 | 28 | 0.5 | P |

In Examination, the curl value is small in all the polarizing filters produced in Examples 1–4. Therefore, the polarizing filter and the production method thereof in the present invention are very effective.

Various changes and modifications are possible in the present invention and may be understood to be within the present invention.

What is claimed is:

1. A polarizing filter comprising:

a polarized film;

a first protective film adhered to one surface of said polarized film; and a second protective film adhered to another surface of said polarized film, said second protective film being different from said first protective film in at least one of thickness, physical properties and materials;

wherein when M1 is a coefficient of expansion by water absorption of said first protective film in a direction of a light absorption axis of said polarizing filter and M2 is a coefficient of expansion by water absorption of said second protective film in the direction of the light absorption axis of said polarizing filter, then the coefficients of expansion M1, M2 satisfying a formula;

$0.65 \cdot M1 < M2 < 1.55 \cdot M1$; and wherein said first or second protective film is cut to a strip specimen having 120 mm length in the direction of the light absorption axis of said polarizing filter, said strip specimen is set under a temperature of 23° C. and relative humidity of 65% for two hours, two holes having diameter of 6mm are thereafter formed to have a distance about 100 mm in the direction of the light absorption axis, the distance is measured to obtain an initial distance L1, said strip specimen is dipped in a water for 30 minutes, said distance between said two holes is measured to obtain a water absorption distance L2, and said coefficients of expansion M1 and M2 are calculated from a formula;

$M1 \text{ and } M2 = \{(L2-L1)/L1\} \times 100.$

2. A polarizing filter described in claim 1, the coefficients of expansion M1, M2 satisfy a formula, $0.70 \cdot M1 < M2 < 1.40 \cdot M1$.

3. A polarizing filter described in claim 2, the coefficients of expansion M1, M2 satisfy a formula, $0.85 \cdot M1 < M2 < 1.20 \cdot M1$.

4. A polarizing filter described in claim 3, the coefficients of expansion M1, M2 are larger than 0.02.

5. A polarizing filter as claimed in claim 1, wherein of a difference of the thickness between said first and second protective films is more than 2μm, and less than 100 μm.

6. A polarizing filter as claimed in claim 5, wherein at least one of said first and second protective films is cellulose acylate.

7. A polarizing filter as claimed in claim 6, wherein said polarized film is polyvinylalcohol series.

8. A polarizing filter as claimed in claim 7, wherein said first and second protective films are adhered to said polarized film with an adhesive agent.

* * * * *